(12) United States Patent
Sperry et al.

(10) Patent No.: US 7,607,911 B2
(45) Date of Patent: Oct. 27, 2009

(54) METHOD AND APPARATUS FOR MAKING FOAM-IN-PLACE CUSHIONS WITH SELECTIVE DISTRIBUTION OF FOAM

(75) Inventors: Charles R. Sperry, Northampton, MA (US); Suzanne M. Scott, Springfield, VT (US); Dennis F. McNamara, Jr., Charlestown, NH (US); Vincent A. Piucci, Jr., Spencer, MA (US); Michael J. Schamel, Wilmont, NH (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 491 days.

(21) Appl. No.: 11/411,708

(22) Filed: Apr. 26, 2006

(65) Prior Publication Data

US 2007/0252298 A1 Nov. 1, 2007

(51) Int. Cl.
*B29C 44/12* (2006.01)
*B29C 44/10* (2006.01)

(52) U.S. Cl. ............ 425/373; 264/46.1; 264/46.5; 264/173.11; 264/210.1; 264/280; 425/112; 425/115; 425/4 R; 425/367; 53/373.7; 53/374.3; 53/374.9; 53/554

(58) Field of Classification Search ............ 264/173.11, 264/46.1; 53/374.3, 373.7, 554, 374.9
See application file for complete search history.

(56) References Cited

U.S. PATENT DOCUMENTS 3,091,811 A 6/1963 Hackert
3,123,856 A 3/1964 Dye et al.
3,247,295 A * 4/1966 Burwell .................. 264/54
3,325,823 A 6/1967 Boon
3,566,448 A 3/1971 Ernst (Continued)

FOREIGN PATENT DOCUMENTS

EP 184466 A2 * 6/1986

(Continued)

OTHER PUBLICATIONS

International Search Report for PCT Application No. PCT/US2007066209; Filed Apr. 9, 2007; Date of Completion Sep. 6, 2007; Date of Mailing Sep. 13, 2007.

(Continued)

*Primary Examiner*—Philip C Tucker
*Assistant Examiner*—Alison Hindenlang
(74) *Attorney, Agent, or Firm*—Alston & Bird LLP

(57) ABSTRACT

A method and apparatus for making a foam-in-place cushion in which a foam-forming composition is dispensed between two plastic film portions in a predetermined fashion to selectively control the distribution of the foam in the cushion. A foam dispenser can be moved in a transverse direction as foam is dispensed. A dispersion device can be employed to apply pressure on predetermined areas of the film portions towards each other so as to cause the composition to be redistributed in position in a predetermined manner while the composition is in a less than fully expanded state. The plastic film can then be sealed closed to form an expanding foam cushion that can be placed into a shipping carton where the cushion expands to fill void space, or into a mold where the cushion expands and is molded into a desired shape.

14 Claims, 14 Drawing Sheets

U.S. PATENT DOCUMENTS

| | | | |
|---|---|---|---|
| 3,596,313 | A | 8/1971 | Darmochwal et al. |
| 3,719,734 | A | 3/1973 | Petzetakis |
| 3,751,197 | A | 8/1973 | Petzetaris |
| 3,768,937 | A | 10/1973 | Haga et al. |
| 3,809,512 | A | 5/1974 | Blackwell et al. |
| 3,812,227 | A | 5/1974 | Blackwell et al. |
| 3,906,068 | A | 9/1975 | Hanusa |
| 3,942,925 | A | 3/1976 | Schmitzer et al. |
| 4,005,958 | A | 2/1977 | Porter |
| 4,011,975 | A * | 3/1977 | Brown, Jr. .................. 226/2 |
| 4,032,275 | A | 6/1977 | Schwab et al. |
| 4,056,595 | A | 11/1977 | Bokelmann |
| 4,069,285 | A | 1/1978 | Morgan |
| 4,120,626 | A | 10/1978 | Keller |
| 4,128,611 | A | 12/1978 | Kolakowski et al. |
| 4,298,557 | A | 11/1981 | Bradford et al. |
| 4,348,164 | A | 9/1982 | Fujii et al. |
| 4,567,008 | A | 1/1986 | Griffiths |
| 4,605,683 | A | 8/1986 | Broslaw |
| 4,774,800 | A * | 10/1988 | D'Angelo ..................... 53/553 |
| 5,527,172 | A | 6/1996 | Graham, Jr. |
| 5,679,208 | A | 10/1997 | Sperry et al. |
| 6,003,288 | A | 12/1999 | Sperry et al. |
| 6,178,725 | B1 | 1/2001 | Sperry et al. |
| 6,234,777 | B1 | 5/2001 | Sperry et al. |
| 6,386,850 | B1 * | 5/2002 | Salerno et al. ............... 425/112 |
| 6,472,638 | B1 | 10/2002 | Sperry et al. |
| 6,550,229 | B2 | 4/2003 | Sperry et al. |
| 6,811,059 | B2 | 11/2004 | Piucci, Jr. et al. |

FOREIGN PATENT DOCUMENTS

| | | |
|---|---|---|
| WO | WO 98/14315 | 4/1998 |
| WO | WO 00/78522 | 12/2000 |
| WO | WO 01/70478 | 9/2001 |

OTHER PUBLICATIONS

Written Opinion for PCT Application No. PCT/US2007066209; Filed Apr. 9, 2007.

* cited by examiner

METHOD AND APPARATUS FOR MAKING FOAM-IN-PLACE CUSHIONS WITH SELECTIVE DISTRIBUTION OF FOAM

BACKGROUND OF THE INVENTION

The present invention relates to a method and apparatus for making foam-in-place cushions having a foam-forming composition contained within a flexible bag formed from polymer film supplied as continuous web material, the polymer film being sealed along longitudinal and transverse seals to contain the foam-forming composition, and being severed to detach a foam-in-place cushion from the remaining web material.

Foam-in-place packaging is a highly useful technique for on-demand protection of packaged objects. In its most basic form, foam-in-place packaging comprises injecting a foam-forming composition from a dispenser into a container that holds an object to be cushioned. Typically, the object is wrapped in plastic to keep it from direct contact with the rising (expanding) foam. As the foam rises, it expands into the void space between the object and its container (e.g., a corrugated board box), thus forming a custom cushion for the object.

A common foam-forming composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, an automated apparatus produces foam-in-place cushions by making bags from flexible plastic film and dispensing a foam-forming composition into the bags as they are being formed. As the composition expands into a foam within a bag, the bag is sealed shut and typically is then dropped into a container holding the object to be cushioned. The rising foam again tends to expand into the available space, but does so inside the bag. Because the bags are formed of flexible plastic, they form individual custom foam cushions around the packaged objects. Exemplary types of such packaging apparatus are assigned to the assignee of the present application, and are illustrated, for example, in U.S. Pat. Nos. 4,800,708, 4,854,109, 5,027,583, 5,376,219, and 6,003,288, the contents of each of which are incorporated entirely herein by reference.

As will be noted from the patents listed above, the typical method of forming a foam-in-place cushion from a plastic bag is to heat-seal plies of plastic film material together both transversely and longitudinally as they are being fed from a stock supply to form a generally rectangular bag with the foam inside. In some cases, the stock supply of plastic film material can comprise a C-folded web so that one side of the bag is a fold rather than a heat seal. Foam-in-place packaging apparatus that operate in accordance with such methods have gained rapid and wide acceptance in the marketplace and have served their purposes well.

However, improvement in the operation of such apparatus is continually sought. In this regard, one difficulty associated with conventionally produced foam-in-place cushions is that the cushion as it is discharged from the apparatus does not have the foam-forming composition evenly distributed in the cushion. The foam-forming composition tends to be dispensed into the bottom of the bag and immediately begins expanding as the precursor chemicals react. It is a common practice for an operator to take the cushion discharged from the apparatus, lay the cushion on a flat surface, and use his or her hands to redistribute the foam-forming composition within the cushion into a layer of generally uniform thickness before the cushion is placed into a shipping container.

The problem with this technique is that by the time the operator is able to get the cushion onto the flat surface, the foam-forming composition has already undergone a substantial degree of expansion. When the already-formed foam is redistributed, the cellular structure of the foam is disturbed. This can cause the cushion to expand in volume by a lesser amount than it was designed to do, and therefore the foam density is higher than desired. Moreover, the uniformity of the foam density may be compromised, such that substantial non-uniformities of density may be created in the cushion. Consequently, the cushion may not have the protective properties it was designed to have.

BRIEF SUMMARY OF THE INVENTION

The present invention addresses the above needs and achieves other advantages. In one embodiment of the invention, a method is provided for making foam-in-place cushions, wherein a cushion-making cycle comprises the steps of:

providing a pair of continuous polymer film portions extending along a longitudinal direction and positioning the film portions in parallel opposing relation to each other;

positioning a foam dispenser between the film portions for dispensing a foam-forming composition between the film portions, the foam-forming composition being operable to react to form an expanded polymer foam material, the dispenser being controllable to be either in an "on" state wherein foam-forming composition is dispensed from the dispenser or in an "off" state wherein dispensing of the foam-forming composition is stopped; and placing the foam-forming composition selectively between the film portions by performing at least one of the following operations: (1) moving the dispenser along a transverse direction of the film portions as the foam-forming composition is being dispensed; and (2) advancing the film portions in the longitudinal direction through a dispersion device structured and arranged to apply pressure on predetermined areas of the film portions towards each other so as to cause the foam-forming composition to be to be redistributed while the foam-forming composition is in a less than fully expanded state.

The dispersion device can redistribute the foam-forming composition in various ways for achieving various effects. In one embodiment, the dispersion device redistributes the composition into a layer of substantially uniform thickness. In another embodiment, the dispersion device redistributes the composition into a layer whose thickness varies in a predetermined manner in at least one of the longitudinal and transverse directions.

The redistribution or dispersion of the foam-forming composition by the dispersion device takes place immediately after the foam-forming composition is dispensed. Accordingly, the composition does not have time to undergo any substantial degree of foaming, and hence the redistribution of the composition does not disturb the foam structure that ultimately forms. The composition is able to expand by the desired amount so that the cushion has the desired protective properties.

In yet another embodiment, the foam-forming composition is dispensed as a plurality of discrete volumes of foam-forming composition that are spaced apart in at least one of the longitudinal and transverse directions.

The invention also provides an apparatus for making foam-in-place cushions. The apparatus in accordance with one embodiment of the invention comprises:

a film supply and guide system for supplying a pair of continuous polymer film portions extending along a longitudinal direction and for positioning the film portions in parallel opposing relation to each other;

a dispenser disposed between the film portions and operable for dispensing a foam-forming composition between the film portions, the foam-forming composition being operable to react to form an expanded polymer foam material;

a film drive mechanism structured and arranged for advancing the film portions in the longitudinal direction; and a dispersion device structured and arranged to apply pressure on predetermined areas of the advancing film portions towards each other so as to cause the foam-forming composition to be to be redistributed while the foam-forming composition is in a less than fully expanded state.

The dispersion device in accordance with one embodiment of the invention comprises first and second film-engaging members between which a gap is defined through which the advancing film portions pass with the foam-forming composition therebetween. A width of the gap is adjustable by moving the first and second film-engaging members relative to each other.

In one embodiment, the first film-engaging member comprises a drive roller rotated by a drive motor about an axis parallel to the transverse direction, and the second film-engaging member comprises a dispersion member extending along an axis parallel to and spaced from the axis of the drive roller, the drive roller contacting one of the film portions and the dispersion member contacting the other film portion. The dispersion member can be a freely rotatable roller, a driven roller, a non-rotating rod or bar, or the like. The film portions are advanced in the longitudinal direction by the drive roller, which forms nips with a pair of transversely spaced driven rollers, the opposite longitudinal edges of the film portions passing through the nips and being frictionally engaged and advanced by the drive roller.

The width of the gap between the drive roller and the dispersion member can be set as a function of a characteristic of the cushion that it is desired to produce. For example, the width can be set as a function of the volume of foam-forming composition dispensed. It is also possible to vary the width of the gap as the film portions are advanced through the gap. For instance, the gap can be made progressively wider as the film portions are advanced in order to account for the expansion of the foam-forming composition. As another example, the gap can be varied to cause predetermined variations in thickness of the layer of foam-forming composition along the longitudinal direction.

In one embodiment, the dispersion member is mounted in a frame that is rotatable about a pivot axis spaced from and parallel to the axis of the dispersion member, such that rotation of the frame about the pivot axis causes the gap between the dispersion member and the drive roller to vary in width. According to one method aspect of the invention, at the beginning of a cushion-making cycle the frame is initially positioned such that the dispersion member is in a first position closely adjacent (e.g., in nipping engagement with) the drive roller, and the foam-forming composition is dispensed between the film portions upstream of the dispersion member and drive roller. Next, the frame is rotated to move the dispersion member to a second position spaced farther from the drive roller to set the gap therebetween and the drive roller is rotated to advance the film portions through the gap.

In accordance with one embodiment of the invention, the drive roller advances a predetermined length of the film portions through the gap and is then stopped to halt the film portions, and the film portions are sealed along a transverse seal and are severed. The sealing and severing steps can be performed simultaneously by a heated member placed in contact with the film portions.

In one embodiment, a pressing member is mounted in the frame, and the frame is rotated about the pivot axis to cause the pressing member to press the film portions against the heated member in order to seal and sever the film portions.

At the beginning of a cushion-making cycle, a transverse seal of the film portions can be disposed downstream of the dispersion member and drive roller, and the dispersion member can be placed in nipping engagement with the drive roller so as to press the film portions against the drive roller. Accordingly, when the foam-forming composition is dispensed between the film portions, the transverse seal is initially isolated from the foam-forming composition by the nipping engagement between the dispersion member and drive roller. The incidence of rupturing of the transverse seal by forceful dispensing of the foam-forming composition is thereby substantially reduced or eliminated.

The invention enables selective, controlled placement of foam in a cushion by controlling variables such as movement of the foam dispenser, speed of dispenser movement, advancement of the film portions, speed of film advancement, "on" and "off" operation of the dispenser, and operation of the dispersion member for controlling foam thickness.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5b is a cross-sectional view through the cushion of FIG. 5a;

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
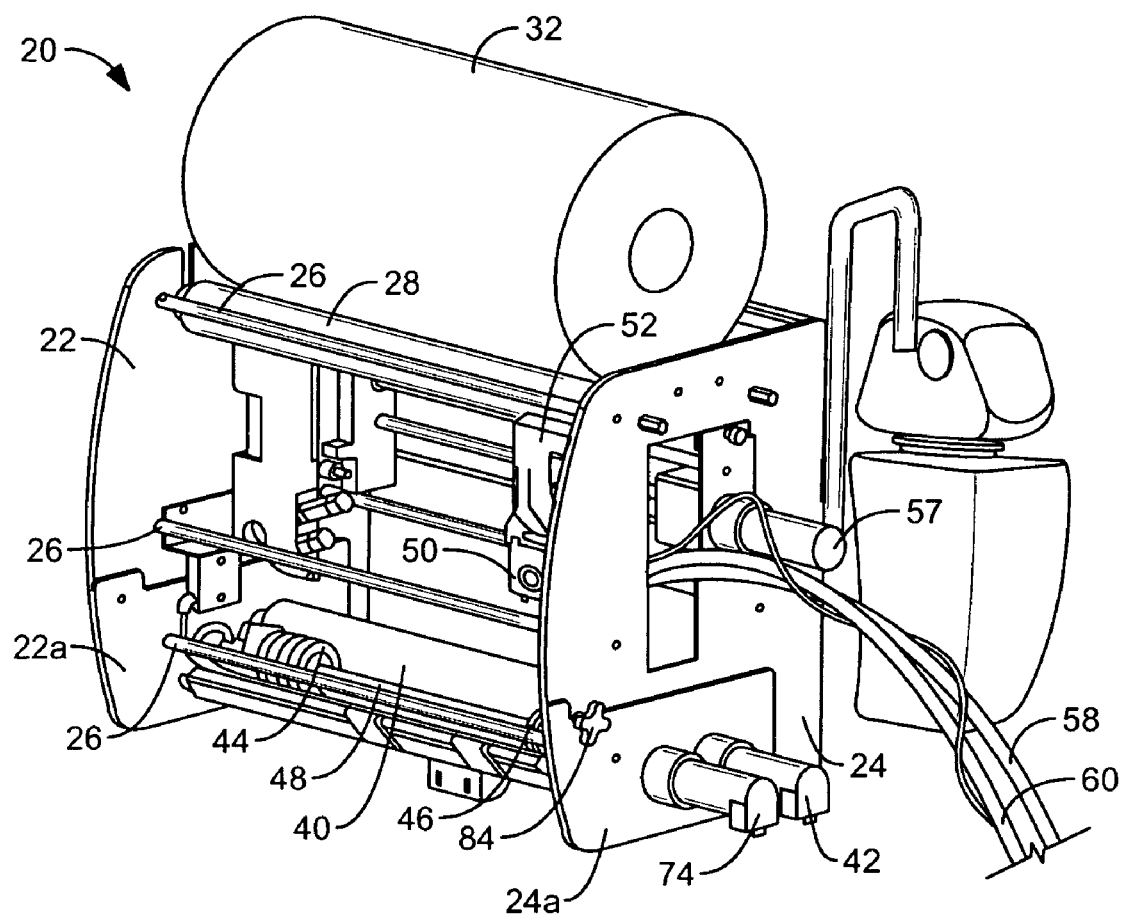
FIG. 1 is a perspective view of an apparatus for making foam-in-bag cushions in accordance with one embodiment of the invention.
Figure 2:
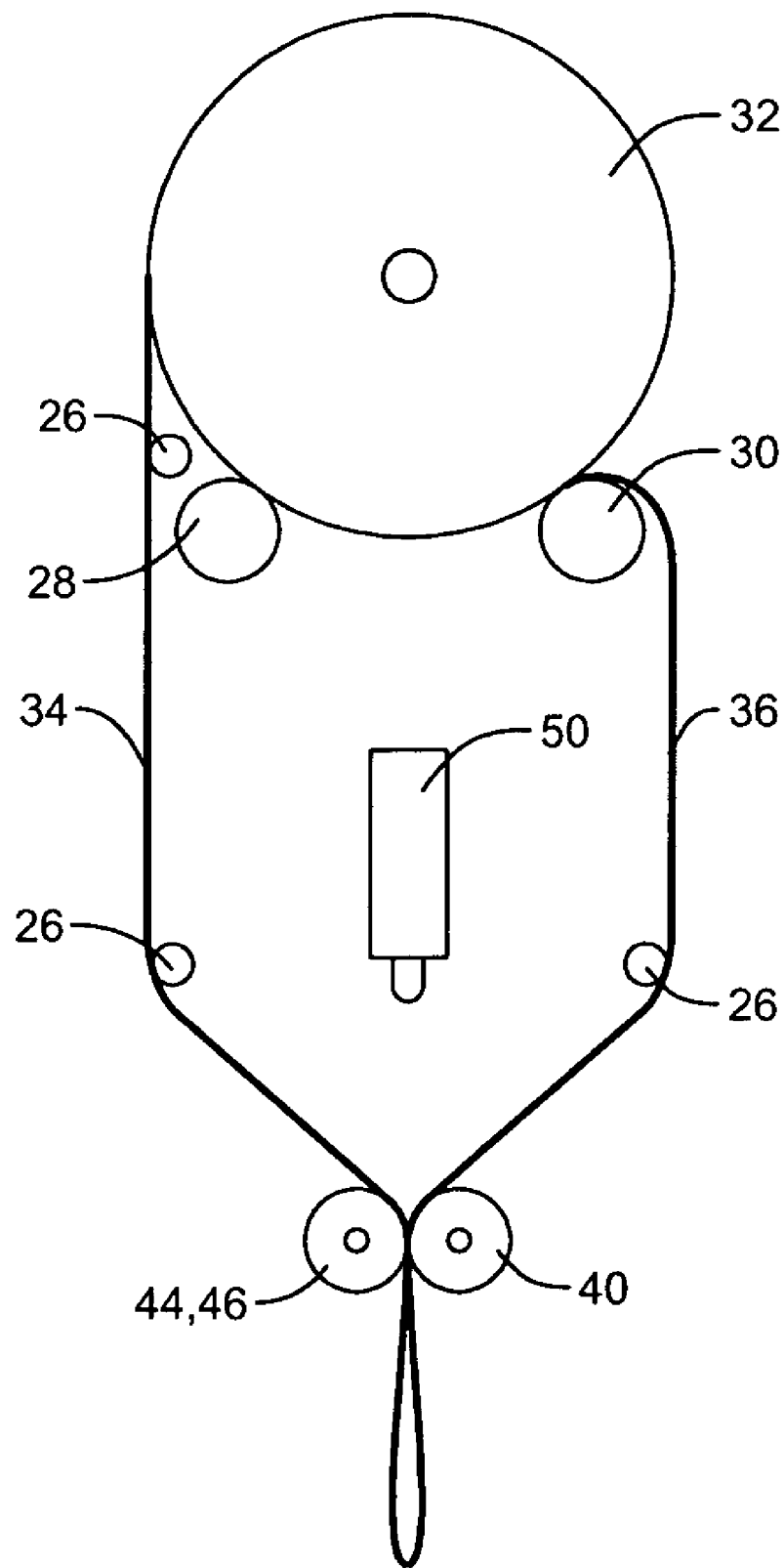
FIG. 2 is a diagrammatic cross-sectional view through the apparatus along a plane orthogonal to the axis of the supply roll of polymer film.
Figure 3:
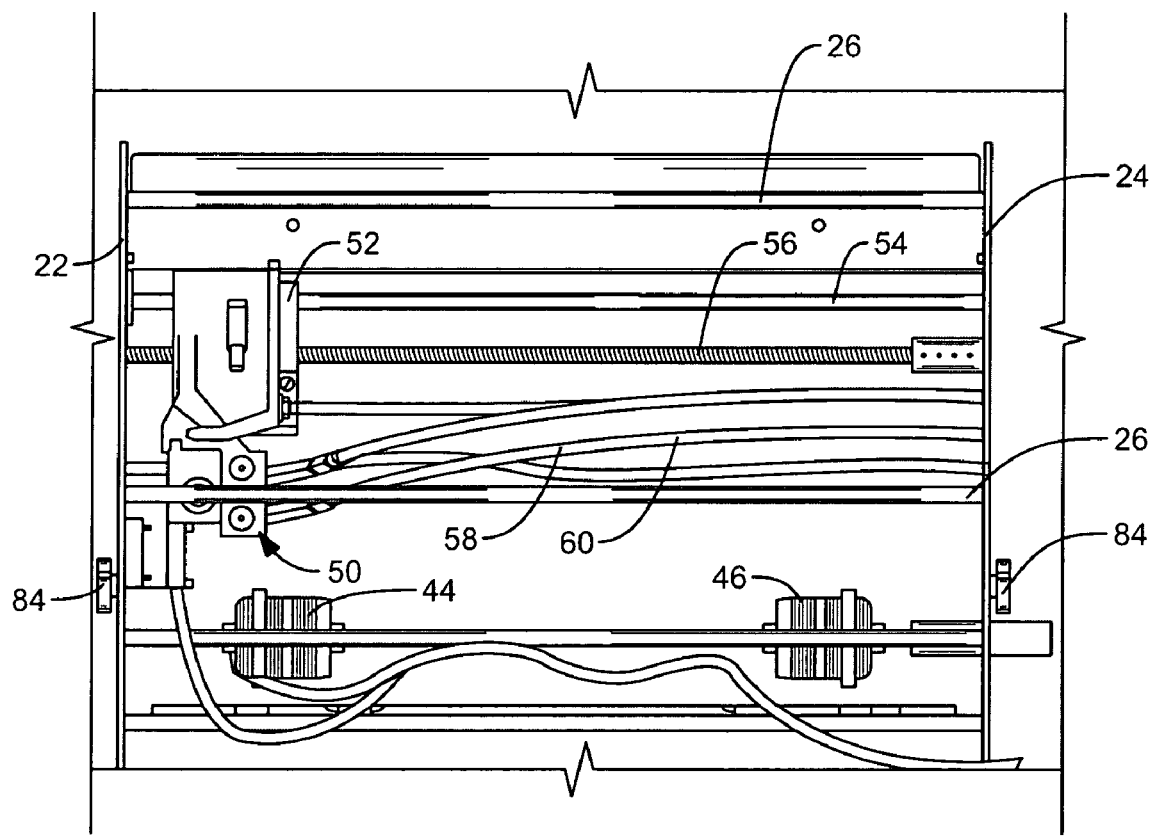
FIG. 3 is a front elevation of the apparatus showing details of the mechanism for traversing the foam dispenser.

FIGS. 1 through 3 depict an apparatus 20 for making foam-in-bag cushions in accordance with one embodiment of the invention. The apparatus includes a pair of spaced-apart, parallel frame members 22, 24 each of which is generally in the form of a plate, and a plurality of support rods 26 or the like that are connected between the frame members 22, 24 to form a generally rigid frame. At the top end of the frame, a pair of freely rotatable idler rollers 28, 30 are rotatably supported between the frame members 22, 24 for supporting a supply roll 32 of two-ply film material. The supply roll comprises two separate polymer film plies laid one upon the other and then wound about a hollow tubular core to form a roll of the two-ply film material. As shown in FIG. 2, one ply 34 of the two-ply film material unwinds from the supply roll 32 and proceeds downwardly past the idler roller 28; the ply 34 can be guided by two of the rods 26 as shown, or alternatively the upper rod 26 shown in FIG. 2 can be omitted. The other ply 36 of the two-ply film material unwinds from the supply roll 32 and through a nip between the roll 32 and the other idler roller 30, and then proceeds downwardly and is guided by another rod 26. An apparatus of generally the same type for making foam-in-bag cushions using a two-ply film supply is described in U.S. Pat. No. 6,178,725 and U.S. Pat. No. 6,472,638, the entire disclosures of which are incorporated herein by reference.

The apparatus includes a drive roller 40 that is rotatably mounted between the frame members 22, 24 near a lower end of the frame and is driven by a motor 42 mounted on the frame member 24. The apparatus further includes a pair of transversely spaced, freely rotating driven rollers 44, 46 mounted on a shaft 48 that extends between the frame members 22, 24. The driven rollers 44, 46 form nips with the drive roller 40. The film plies 34, 36 are threaded through the nips between the driven rollers and the drive roller, as shown in FIG. 2. The drive roller 40 includes an outer surface that is resiliently compressible and frictionally grips the film so that the film is driven by the drive roller substantially without slipping. For example, the drive roller can be formed of a rigid cylindrical roller covered with a sleeve of foam material such as silicone foam having a durometer hardness of 70 Shore A and having a thickness of about 0.25 inch. As illustrated, the driven rollers 44, 46 can have circumferential ridges that are spaced apart along the lengthwise direction of the rollers for imparting longitudinal ridges in the edges of the film plies, which gives rigidity to the film edges and also helps ensure that the film is driven straight out from the rollers and does not wrap around the drive roller 40.

The apparatus further comprises a foam dispenser 50 that is mounted on a carriage 52 disposed between the two film plies 34, 36. The carriage 52 is slidably mounted on a guide rail 54 that extends between the frame members 22, 24. A rotatable feed screw 56 is rotatably mounted between the frame members and is driven by a reversible motor 57. The feed screw engages a nut (not shown) on the carriage 52. Thus, rotation of the feed screw 56 in one direction causes the carriage 52 and dispenser 50 to move to the left along guide rail 54 in FIG. 3, and rotation of the feed screw in the opposite direction moves the carriage and dispenser to the right in FIG. 3. Variation in the rotational speed of the screw 56 causes the speed of movement of the dispenser to be varied. The foam dispenser is fed by feed hoses 58, 60 that feed two precursor chemicals to the dispenser, where the precursor chemicals mix (either internally within a mixing chamber of the dispenser, or externally upon being dispensed from the dispenser), to form a foam-forming composition. The composition is dispensed between the two plies 34, 36 of the polymer film material at a location just above (upstream of) the drive roller 40 and driven rollers 44, 46.

Figure 4:
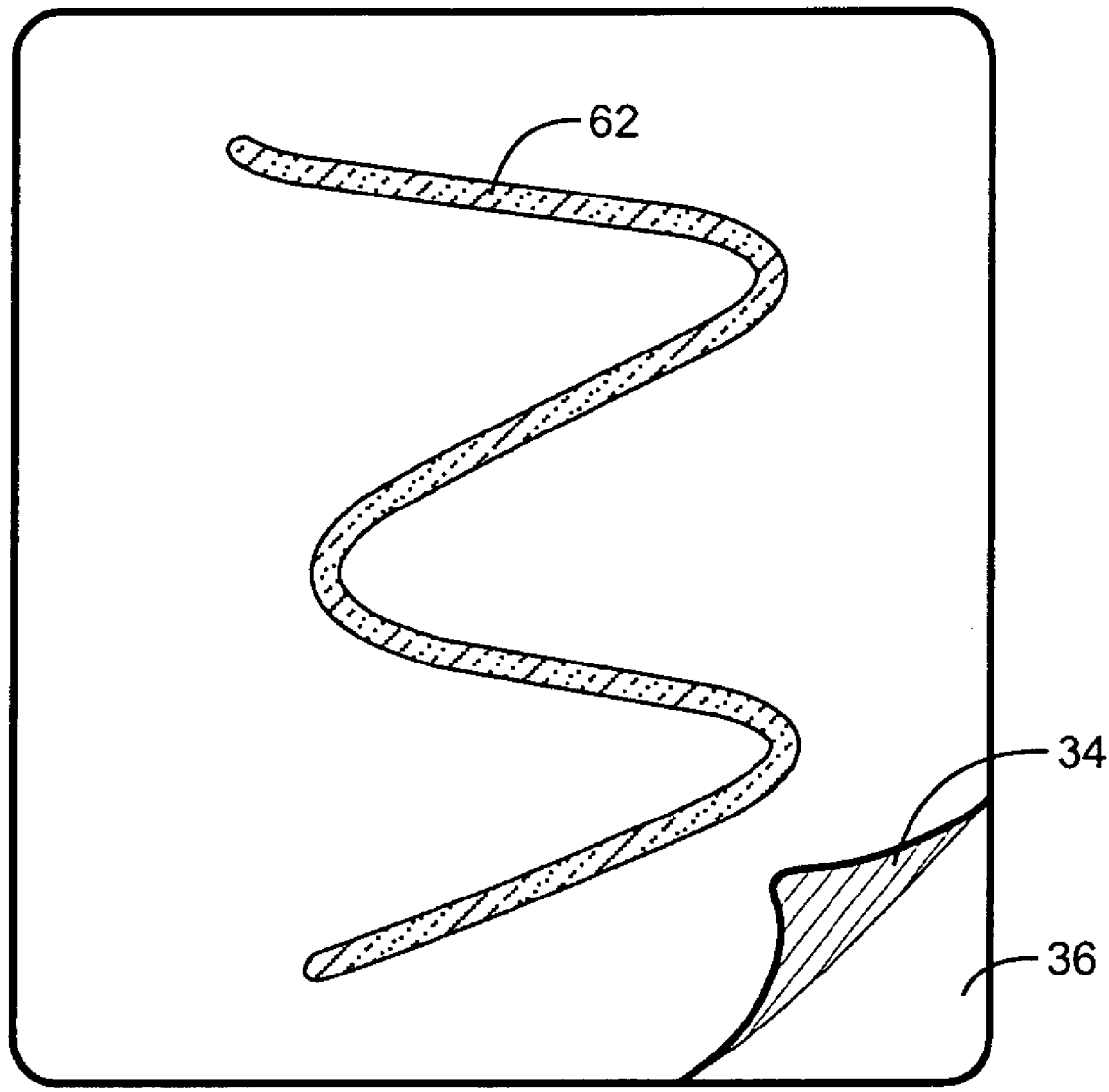
FIG. 4 is a diagrammatic illustration of a cushion showing one possible pattern in which the foam-forming composition is dispensed in accordance with one embodiment of the invention.

By controlling the movement (i.e., positioning and, optionally, speed) of the dispenser 50 in the transverse direction it is possible to dispense the foam-forming composition in any of various patterns. The possible patterns are further multiplied by driving the film plies 34, 36 while the composition is being dispensed (and optionally varying the speed of the film movement), and/or by momentarily interrupting the flow of the composition one or more times during the traversing of the dispenser 50 and/or during the movement of the film plies. FIG. 4 shows only one of many possible patterns of the foam-forming composition 62 that are possible in accordance with the invention. The illustrated zigzag pattern is formed by moving the dispenser back and forth such that the dispenser changes directions three times while the film plies 34, 36 are driven by the drive roller 40. The pattern is continuous in that the composition forms an unbroken string. However, discontinuous patterns (not shown) formed by discrete spaced-apart regions of composition are also possible by momentarily interrupting the flow of the composition, as noted. For instance, the foam can be dispensed as two or more stripes extending transversely and spaced apart longitudinally, as dots spaced apart transversely and longitudinally, etc.

Figure 6:
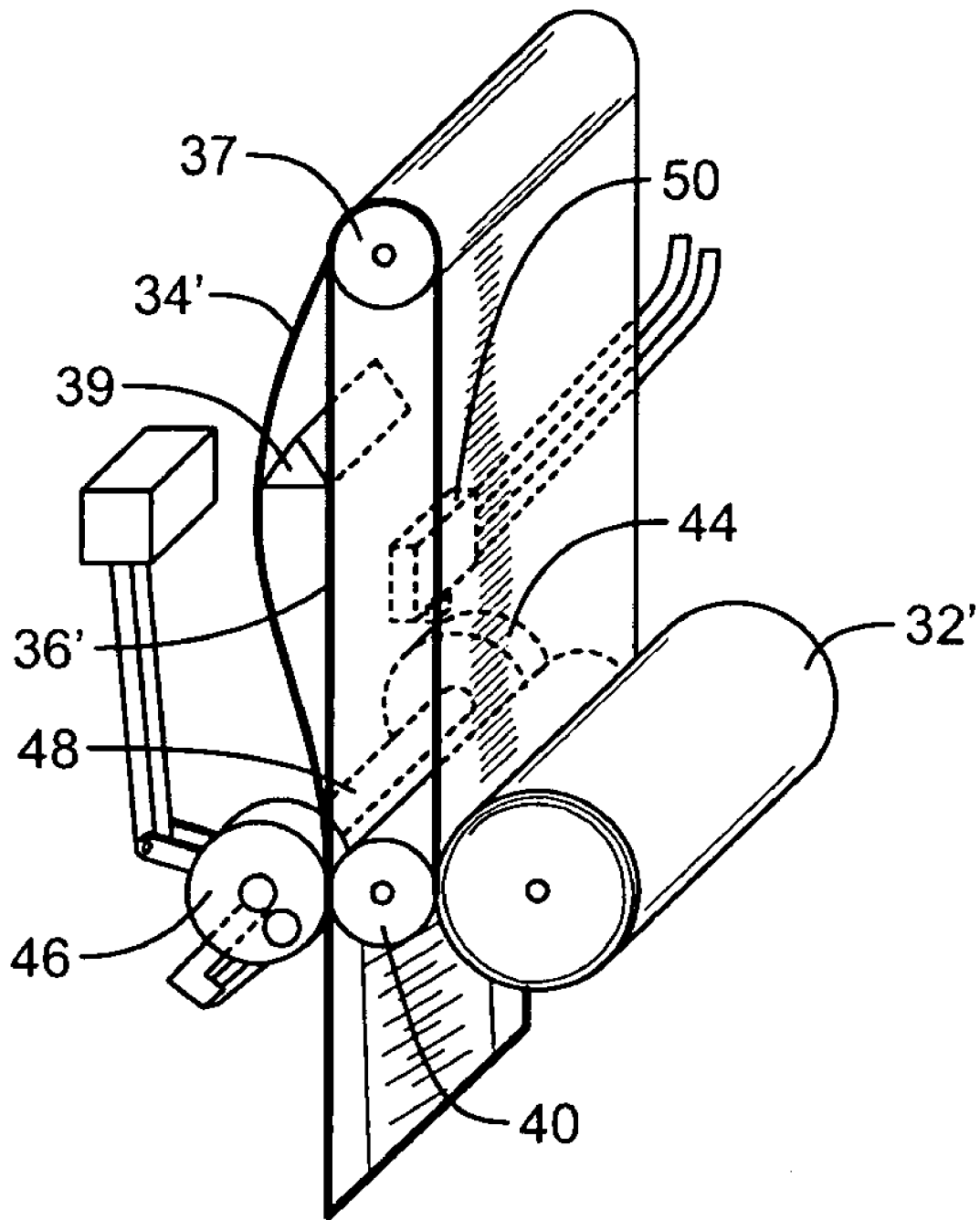
FIG. 6 is a diagrammatic perspective view of a portion of an apparatus in accordance with another embodiment of the invention, having an alternative film supply and drive system.
Figure 7:
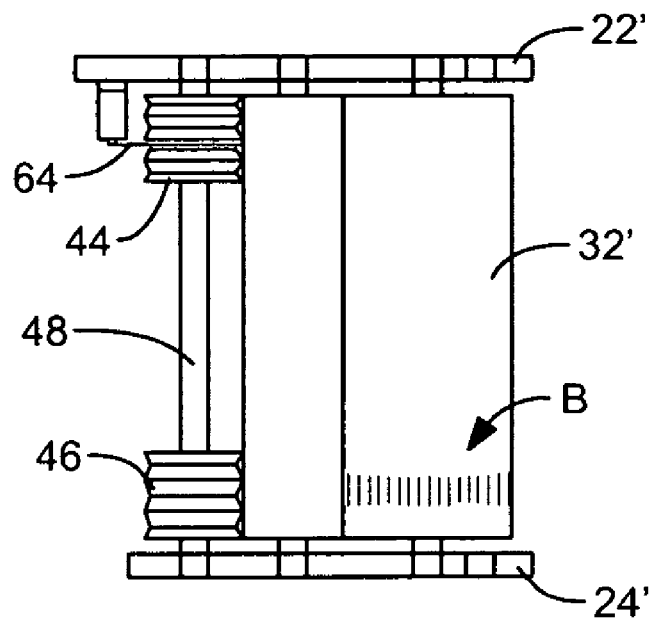
FIG. 7 is a top view of the film supply and drive system of the apparatus of FIG. 6.
Figure 8:
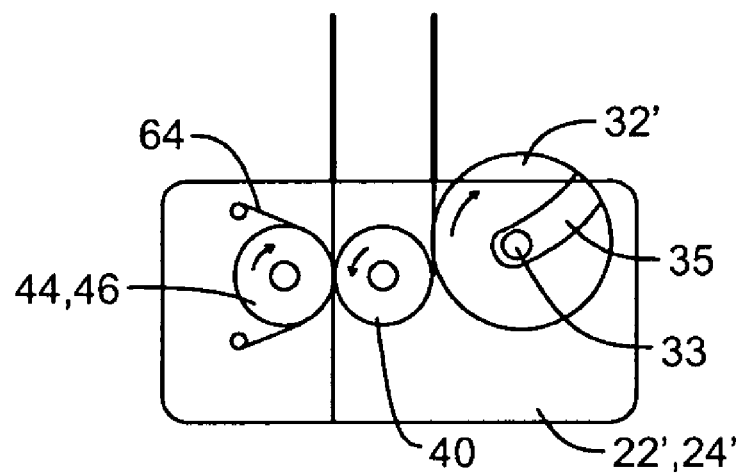
FIG. 8 is a side view of the film supply and drive system.

An alternative embodiment of a film supply and drive system in accordance with the invention is depicted in FIGS. 6 through 8. This embodiment employs a film supply roll 32' of C-fold film, i.e., a flat film folded along a medial longitudinal line such that one edge of the flat film is aligned with the other edge of the flat film, thus forming two film portions 34' and 36' in parallel overlying relation. The supply roll 32' is mounted on a shaft 33 whose opposite ends protrude out beyond the ends of the roll and engage slots 35 in the frame members 22', 24' that are configured to cause the roll to engage the drive roller 40. The slots 35 are inclined such that gravity urges the supply roll against the drive roller. Accordingly, rotation of the drive roller causes the supply roll to be rotated so as to pay out the C-fold film. The film is guided upwardly and over a freely rotating guide roller 37 rotatably mounted between the frame members 22', 24' and the two plies 34', 36' are moved apart by a separator member 39 to make space for the dispenser that projects between the plies from the open edge of the C-fold film. The film is then threaded through the nips between the drive roller 40 and the driven rollers 44, 46 as in the prior embodiment.

In the C-fold embodiment of the apparatus, as best seen in FIG. 7, the apparatus includes a longitudinal sealing device for sealing the two film plies 34', 36' together along the open edge of the C-fold film after the foam-forming composition has been dispensed between the plies. Various types of longitudinal sealing devices can be used, the invention not being limited in this respect. A suitable type of longitudinal sealing device is a sealing wire such as described in U.S. Pat. No. 6,550,229, the entire disclosure of which is incorporated herein by reference. This type of sealing device comprises a sealing wire 64 that wraps partially about the driven roller 44 and resides in a groove formed in the roller (e.g., between two of the aforementioned circumferential ridges of the roller) such that as the film plies pass through the nip between the roller and the drive roller 40, the sealing wire contacts the film plies. The sealing wire comprises a resistance wire that becomes hot upon passing an electrical current through the wire, so as to heat the film plies to their melting point in the localized region contacted by the sealing wire, thereby sealing the plies together. Alternatively, the sealing device can be as described in U.S. Pat. No. 6,472,638, the entire disclosure of which is incorporated herein by reference.

It will be recognized that in the first embodiment of the apparatus described above employing a supply roll 32 of two-ply film, such a longitudinal sealing device is required at each of the two edges of the film. Accordingly, a sealing device as described above can be associated with the other driven roller 46.

Figure 9:
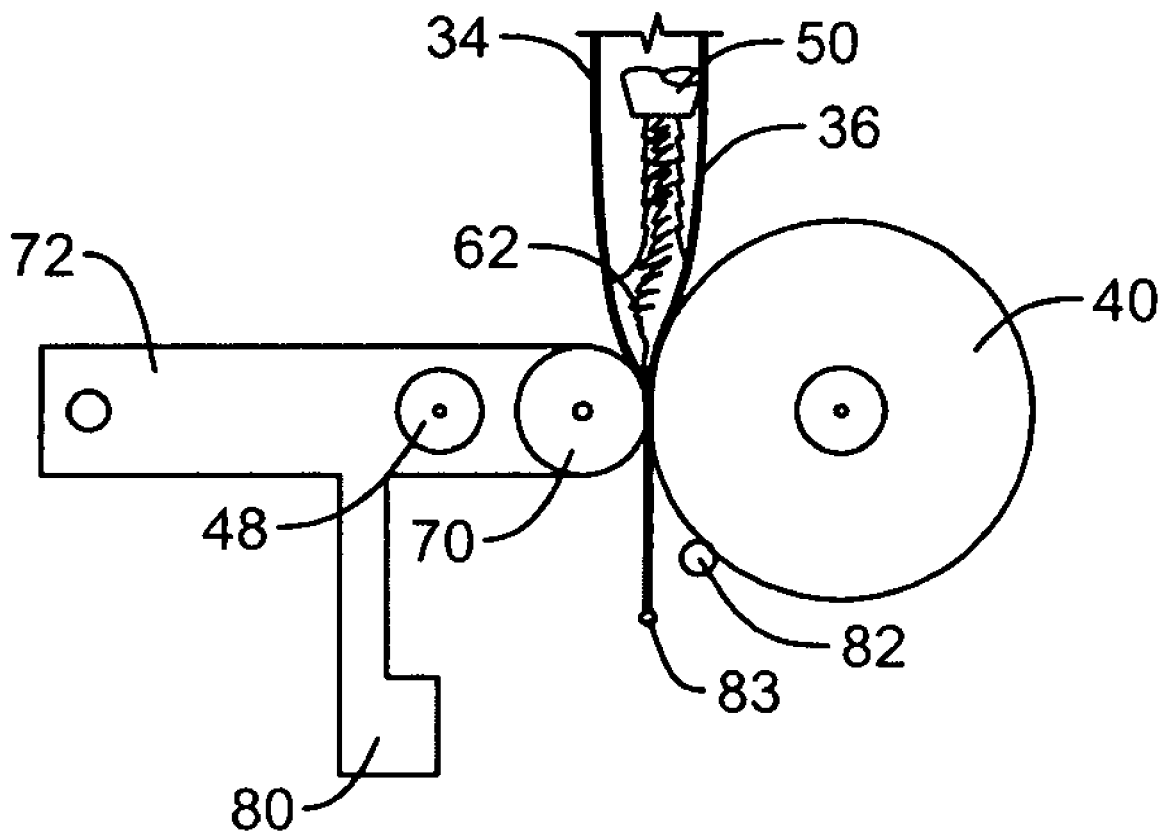
FIG. 9 is a diagrammatic side view of the film drive system with the dispersion device and cross-sealing and cutoff device, showing a foam-forming composition being dispensed at the beginning of a cushion-making cycle.
Figure 10:
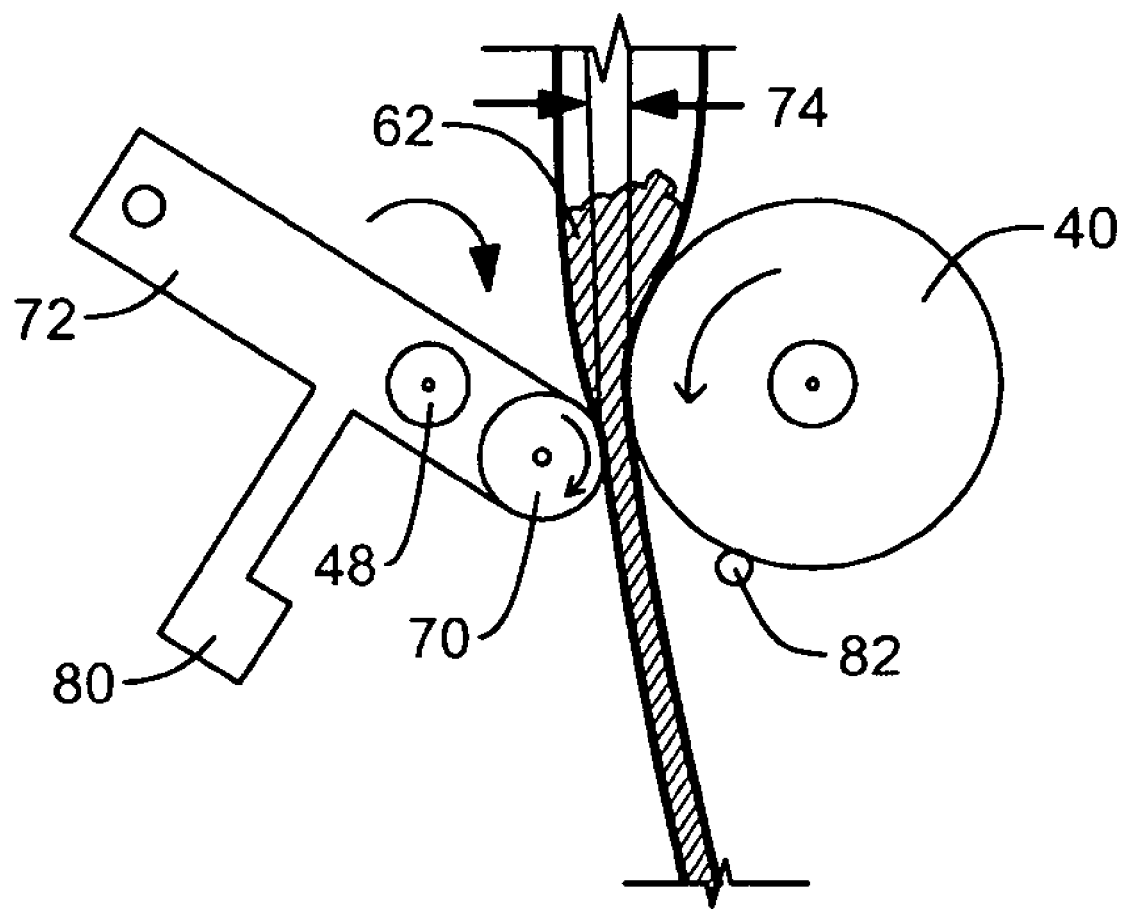
FIG. 10 is a view similar to FIG. 9, at a later instant in time at which the film drive system is operative to drive the film and the dispersion device has been actuated to set predetermined gap between the dispersion device and the drive roller to redistribute the foam-forming composition between the film portions.
Figure 11:
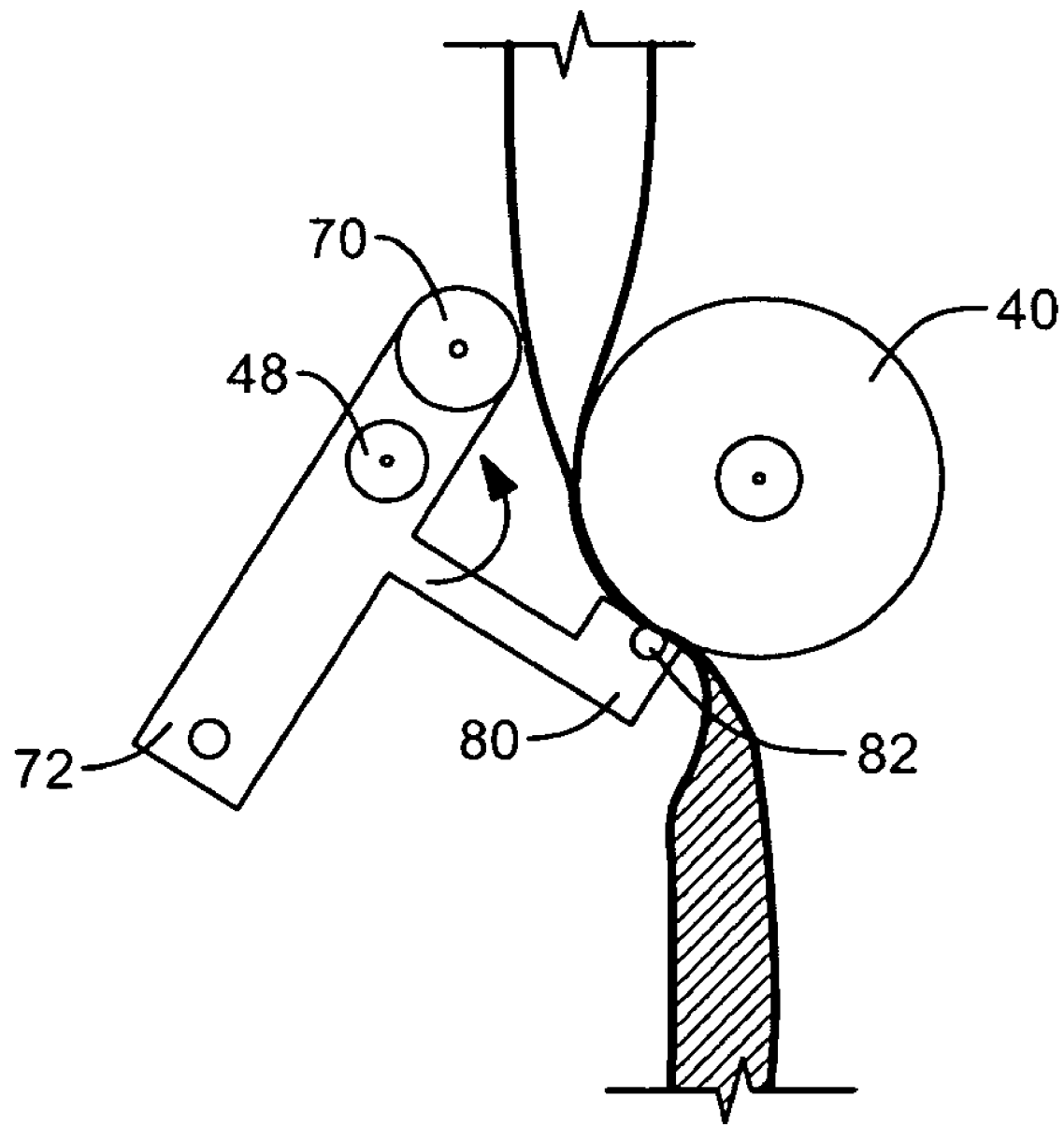
FIG. 11 is a view similar to FIGS. 9 and 10, at a still later instant in time at which the cross-sealing and cutoff device has been actuated to seal and cut off the cushion.

The following description of a dispersion device and a cross-sealing and cutoff device is applicable to both of the above-described embodiments of the invention. FIGS. 9 through 11 diagrammatically illustrate the structure and operation of the dispersion device and the cross-sealing and cutoff device in accordance with one embodiment of the invention. The apparatus includes a dispersion member 70 that is movably mounted with respect to the drive roller 40 and extends parallel to the drive roller's axis of rotation. In the illustrated embodiment, the dispersion member 70 comprises a freely rotating roller that is rotatably mounted in a frame 72; however, alternatively the dispersion member can be a non-rotatable member such as a rod or the like, or can be a driven roller that is rotatably driven by a suitable driving arrangement (not shown). The frame 72 itself is rotatably mounted in the apparatus such that it is rotatable about the axis of the shaft 48 of the driven rollers 44, 46. A reversible motor 74 (FIG. 1) is coupled to the frame 72 for rotating the frame either in one direction or the other. Rotation of the frame 72 about the axis of the shaft 48 causes the dispersion member 70 to be moved toward or away from the drive roller 40. An encoder (not shown) can be associated with the frame 72 (e.g., the encoder can be built into the motor 74) for allowing the rotational orientation of the frame to be detected and to be controlled by suitably controlling the motor 74 based on the encoder output.

FIG. 9 depicts the frame 72 in a position placing the dispersion member 70 in nipping engagement with the drive roller 40. Rotation of the frame 72 in one direction is effective for moving the dispersion member away from the drive roller so as to create a gap 74 therebetween, as shown in FIG. 10. Control of the positioning of the frame 72 is effective for adjusting the gap 74 to any of various distances depending on the requirements of the particular cushion being produced.

Because the frame 72 rotates about the axis of the driven rollers 44, 46, the driven rollers remain in nipping engagement with the drive roller 40 regardless of the rotational positioning of the frame 72. In accordance with the invention, the frame 72 initially can be positioned as shown in FIG. 9, with the dispersion member 70 in nipping engagement with the drive roller 40. The foam dispenser 50 is operated to dispense the foam-forming composition 62 between the film plies 34, 36. The frame 72 is rotated to move the dispersion member 70 away from the drive roller 40 to set a predetermined gap 74 and the drive roller 40 is rotated to drive the film through the apparatus as shown in FIG. 10. The dispersion member 70 exerts pressure on the film portion 34 toward the opposite film portion 36 to cause the foam-forming composition 62 to be spatially redistributed between the film plies in a desired fashion as the film is driven by the drive roller 40. This redistribution of the composition advantageously takes place before the composition has undergone any significant degree of expansion.

Figure 5A:
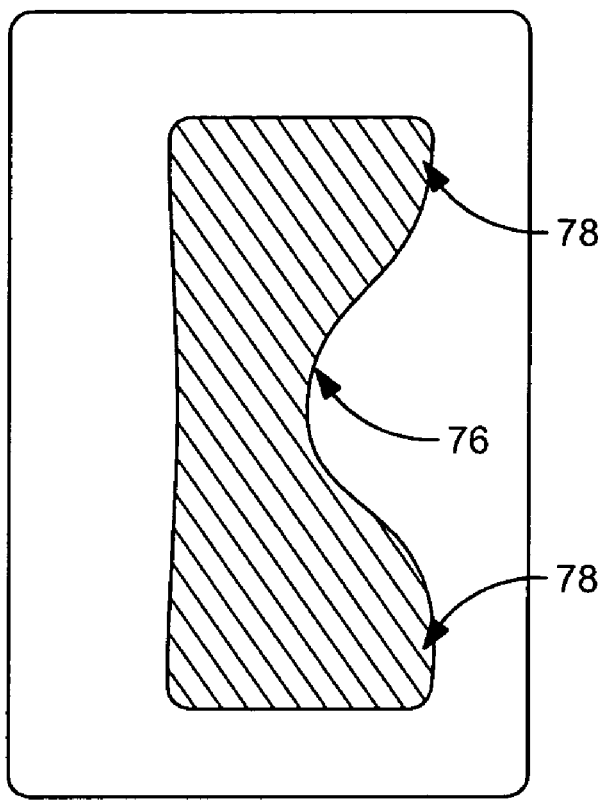
FIG. 5a is a diagrammatic illustration of a cushion after passage through the dispersion device, in accordance with an embodiment of the invention.
Figure 5B:
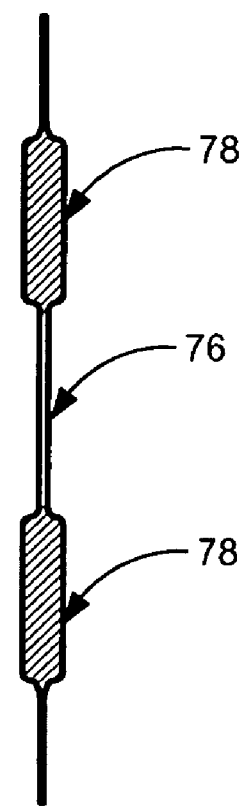

The manner in which the composition is redistributed is dictated by the size of the gap 74 and the configuration of the dispersion member 70, as well as by whether the dispersion device rotates or is stationary. For example, FIGS. 5a and 5b show a cushion processed by a dispersion member of constant circular cylindrical cross-section, wherein the size of the gap 74 is varied as the film is being driven through the gap. More particularly, the foam-forming composition is redistributed to include a region of relatively small thickness 76 produced by making the gap 74 smaller, flanked by two regions of greater thickness 78 produced by making the gap 74 larger. Thus, initially as the foam is dispensed and the film portions are advanced, the gap 74 is set larger to produce one of the thick regions 78, then the gap is reduced to produce the thin region 76, and finally the gap is increased to produce the second thick region 78. It is also possible to produce regions of different thicknesses by configuring the dispersion device to have a non-constant shape for redistributing the foam composition in a non-constant fashion in the widthwise and/or lengthwise direction of the cushion. The asymmetric shape of the regions 76, 78 as depicted in FIG. 5a can be produced by dispensing the foam in a generally C-shaped configuration by traversing the dispenser back and forth as the film is advanced and possibly varying the speed of the film. Alternatively, a generally symmetric shape can be produced by keeping the dispenser stationary as the foam is dispensed and the film is advanced.

Once the film plies have been driven for a length corresponding to the desired length of the cushion to be produced, the drive roller 40 is halted and the frame 72 is rotated as shown in FIG. 11 to cause a sealing anvil 80 connected with the frame to urge the film plies against a transverse sealing wire 82 that is heated by passing an electrical current through the wire. The drive roller 40 forms a backing member for the sealing wire 82 such that the anvil 80 can firmly urge the film plies against the sealing wire. The anvil can have a surface that is resiliently deformable. For example, the anvil surface can be formed by a layer of polymer foam such as silicone foam of about 0.25 inch thickness. The heated sealing wire simultaneously severs the film plies and also seals the plies together to form a transverse seal that seals the completed cushion along its top transverse edge and also serves to create the bottom transverse seal 83 (FIG. 9) for the next cushion to be produced.

Figure 12:
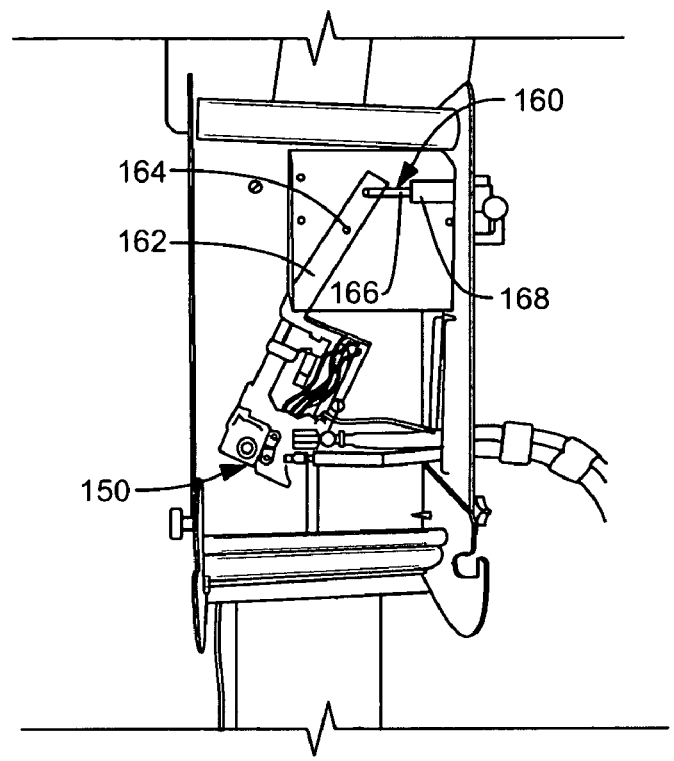
FIG. 12 is a front elevation of an apparatus having a pivoting foam dispenser in accordance with another embodiment of the invention, showing the foam dispenser in a first position.
Figure 13:
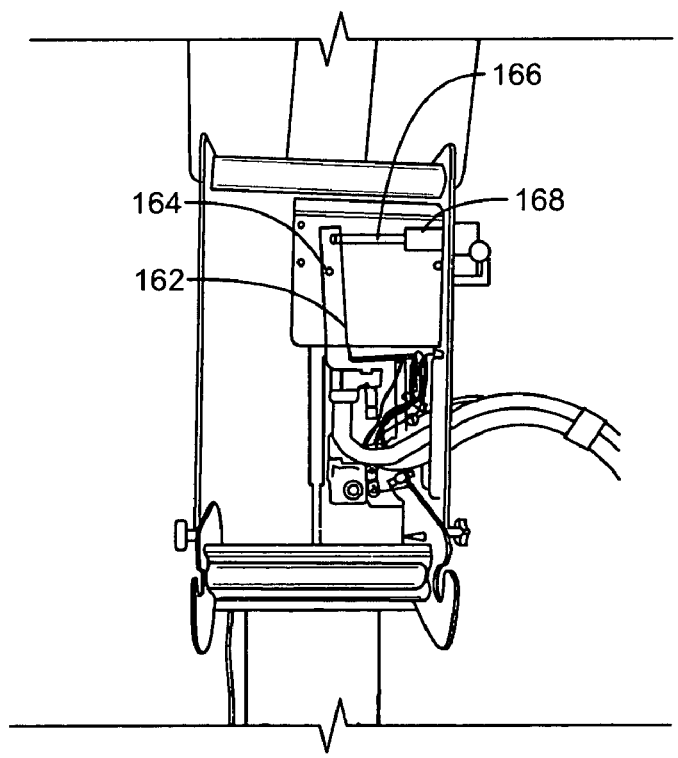
FIG. 13 is a view similar to FIG. 12, showing the foam dispenser in a second position.

FIGS. 12 and 13 depict an apparatus in accordance with yet another embodiment of the invention, wherein parts of the apparatus have been omitted for clarity. The apparatus differs from the previously described embodiments in that the foam dispenser 150 is mounted on a traversing mechanism 160 that moves in a pivoting fashion rather than a linearly translating fashion. More specifically, the dispenser is mounted on the lower end of an arm 162 that pivots about an axis 164 located at an intermediate position along the length of the arm. The top end of the arm 162 is connected to a rod 166 of a fluid cylinder 168 such as a pneumatic or hydraulic cylinder. Thus, retraction of the rod (FIG. 12) pivots the arm 162 in one direction and extension of the rod (FIG. 13) pivots the arm in the other direction. By suitably controlling the cylinder 168 as the foam composition is dispensed from the dispenser 150, the foam composition can be dispensed in various patterns, as previously described.

The apparatus in accordance with any of the embodiments of the invention can include various sensors for detecting conditions in the apparatus and to aid in controlling the operation of the apparatus. For example, it may be desired to make a cushion of a predetermined length. To control the apparatus to make the desired cushion length, the film supply can have opaque bars B printed along the film at a known fixed interval, as shown in FIG. 7. A photoelectric sensor (not shown) can be located inside the machine housing and aimed to detect the bars. This sensor can differentiate the bars from the unprinted film. The electronic control assembly (not shown) can count the bars based on the information received from the sensor and measure the length of film that has advanced. In this way, the controller can accurately feed film in order to make a cushion of the length desired. It can also sense when the film supply runs out and thus can stop the machine from attempting to make a cushion without film.

Alternatively, the rotation of the drive roller 40 can be detected with an encoder or the like, and the encoder output can be used to determine precisely how much film length has been driven through the apparatus. The encoder can be built into the motor 42 or can be separate from the motor. This allows the bars B to be eliminated from the film supply.

Upon power-up of the apparatus, the controller performs a cleaning cycle for the dispenser's solvent system, and performs other self tests. The solvent system can be as described in U.S. Pat. No. 6,811,059 entitled "Self-Cleaning Fluid Dispenser", the entire disclosure of which is incorporated herein by reference. Before the apparatus makes the first cushion, it runs a cycle with film only and no chemical. This is to insure that there is a bottom cross seal 83 (FIG. 9). The apparatus advantageously produces an empty cushion each time it is powered up, whenever the film roll is changed, or after any error condition. The operator then selects a cushion length and thickness by pressing keys on a keypad connected with the controller. The length of the cushion can be from a few inches to many feet, but most cushions will be in the range of 1 to 5 feet. The thickness is variable from about one-half inch to over 2 inches after the foam has expanded.

At the beginning of the cycle, the dispersion member 70 can be in the starting position as shown in FIG. 9. The dispenser 50, 150 moves to a predetermined starting position and begins dispensing. The drive roller 40 begins to drive the film, and the gap 74 between the dispersion member 70 and drive roller is opened to the desired value as indicated in FIG. 10. The drive roller advances the film the correct amount for the length selected. During drive and dispensing, the dispenser can be traversed along the transverse direction (e.g., in a back and forth motion), spreading a bead of foam inside the film plies at the junction of the dispersion device and drive roller. Additionally, if desired, the dispersion member 70 can be moved to vary the size of the gap 74 as the film is advanced. The amount of chemical dispensed is determined by the controller based on the selected cushion length and thickness. While the film is advancing, the longitudinal sealing device(s) can be operated to seal the film plies together along the longitudinal edge(s). The sealing device(s) can be cycled off momentarily at one or more positions along the edge to create one or more spaces where the film is not fused, thus allowing air to vent from the bag as the foam expands. At the end of the drive cycle the frame 72 is rotated into the cross-sealing and cutoff position, and the cushion is sealed and severed as in FIG. 11. The frame 72 is then rotated to a neutral position and the operator takes the expanding cushion from the apparatus. At the end of the cycle, the dispenser is returned to a predetermined position and a solvent cycle is performed to clean the dispenser.

The apparatus can also include a sensor for determining whether the dispenser nozzle is dirty and requires attention. Typically, when the dispenser nozzle is dirty, a foam build-up will form on the end of the nozzle and will protrude below the nozzle. The apparatus can include a sensor such as a laser sensor positioned to direct a beam along a path that will be clear as long as the nozzle does not have any significant foam build-up, but that will be blocked when the foam builds up to a certain extent on the nozzle. The sensor can be directed toward a reflector mounted in the apparatus, and the sensor and reflector can be placed in a predetermined location, such as all the way to one side of the dispenser's range of travel, outside the path of the film through the apparatus. Accordingly, when the dispenser is placed in the predetermined position, if the nozzle is not dirty the laser beam is reflected by the reflector back to a detector, which indicates a normal condition of the nozzle. However, if the foam has built up far enough to block the beam, the detector does not receive the beam and thus indicates the nozzle needs attention. Other types of sensors can be used instead of the laser and reflector arrangement.

In accordance with the invention, the dispersion of the foam-forming composition is controlled as the foam is dispensed between the plies and/or immediately after dispensing. All manipulation of the foam placement is completed while the chemical is in the liquid state and prior to any significant amount of expansion. Prior foam-in-bag machines dispense the chemical into the center and bottom of the bag. An operator will often lay the bag on a table and spread the chemical by hand to disperse it across the bag so that the bag can fit into a limited space, such as between an object being packaged and the wall of a box. This is not only time-consuming but is detrimental to the final condition of the cushion because the foam is not spread until it has substantially expanded. Squeezing expanded foam removes gas bubbles and causes the foam to become more dense, which changes the density and protective characteristics that are designed into the foam cushion. Since the cushions of the present invention are immediately ready for use as they emerge from the apparatus, they are less expanded and more pliable and can be more conformably wrapped around the objects to be packaged, holding them more securely and providing increased protection. Since the dispersion of the foam-forming composition is completed prior to expansion, the foam rises as designed, and the density is as designed.

Planar cushions formed in accordance with the invention can be used in multi-layer packaging, which is especially useful when packing multiple small items. A cushion is laid flat and the items are arrayed onto it. A next cushion is laid onto the top of the items and another layer of items is placed onto it, followed by another cushion, etc. In this way, multiple layers of items are sandwiched between cushions, which conform to the shape of the items to secure them.

Cushions made in accordance with the invention can also be used to line the inside of a box or other container. An item can be placed into a container and then wrapped to hold it in place and protect it. If multiple items are placed into a container, the cushion can be weaved through the items to hold them all in place.

The previous examples are applications unique to planar cushions and cannot be practically accomplished with foam-in-bag cushions made by prior machines because the cushions that emerge from such machines are not planar but rather have the foam all located at the bottom of the bag, as already noted. The present invention, however, can also provide distinct advantages when used in traditional foam-in-bag applications. One such application is the packaging of fragile items in boxes for shipping. In general, a bag of expanding foam is placed in the bottom of the box. The item to be packed is placed on the expanding cushion. Another bag of expanding foam is then placed in the box on top of the item and the box is sealed as the foam finishes expanding and curing. With other foam-in-bag cushions, all of the expanding foam is in the bottom of the bag as it is placed into the box. The packer will often spread the foam by hand to get better coverage and fill. The chemical has already risen substantially by the time it is spread. The action of spreading partially expanded foam forces gas from the foam, so as it finishes rising, the foam does not expand to its full extent. The foam is thus denser than it is designed to be, so its protective qualities have changed. Also, because the foam is denser, more chemical is required to fill the void. This increases the cost and decreases the quality of the packaging, and also increases shipping costs because of the greater weight of the cushions.

With the cushions of the present invention, all redistribution of the chemical is done before it has risen significantly, so the density is correct and less chemical is needed. This saves cost and produces a better quality cushion. Another advantage is that, since the foam is spread more evenly across and around the object being packaged, it more easily and consistently fills the void space in the carton. The foam in the present invention does not have to travel throughout the bag as it fills the void. This reduces pressures inside the box as the foam expands since the foam does not have to force its way around the object as it expands. Venting of the bag and complications caused by wrinkles in the film are thus less of an issue, and foam shrinkage caused by poor venting is virtually eliminated.

Another area in which the current invention has an advantage over existing foam-in-bag products is in the molding of pre-formed cushions. The mold consists of a box with an internal cavity and a lid. The internal cavity is in the shape of the desired cushion. This cavity generally has a series of holes through it that connect to a plenum in the back side of the mold, which is connected to a vacuum source. A bag of expanding foam is placed into the mold and the vacuum is applied to assist in sucking the bag of expanding foam into the depth and length of the cavity. As previously described, with traditional foam-in-bag products, all the foam is at one end of the bag, which means it is at one end of the mold. The mold lid is closed, and the expanding foam must travel to the far end of the mold as it expands and fills. As the foam expands and forces its way to the opposite end of the mold, internal pressures are created that exert large forces on the mold lid. These forces vary depending on the size and shape of the mold, but a medium-sized mold lid can easily see forces in excess of 50 pounds. The vacuum remains on through most or all of the foam rise time to assist the rising foam in filling the deepest parts of the cavity. As previously mentioned, the foam may be spread by hand prior to placement into the mold, but again, this densifies the foam and decreases yield.

With the current invention, the foam is spread prior to significant rising and can be tailored not only to the length and width of the mold, but also to the depth of the cavity. For example, the thickness of the foam can be changed so that if, for instance, the cushion is to be thicker at the ends than in the middle, the chemical prior to expansion can be made thicker at the ends then the middle, through suitable design and control of the dispersion device. When the bag is placed into the mold, the chemical already covers the length and width of the cavity, so substantially all of the expansion of the foam occurs in the direction of the depth of the cavity. The internal pressures, and hence the forces on the lid, are greatly reduced. The example of the 50 pounds plus mentioned above may be on the order of 15 pounds with the current invention. Additionally, the vacuum needs to be on for only a short time, perhaps a second, since it is needed only to assist the bag in settling fully into the cavity. The cushions produced by this method are of a more consistent density and fill, and thus are of a higher quality than previous methods.

Furthermore, with prior foam-in-bag systems, the foam-forming composition is dispensed under a substantial amount of pressure directly onto the lower seal of the bag. Any pinhole leaks or other weaknesses of the seal will cause the expanding chemical to leak to the outside of the film, where it can get onto the operator, the machine, and the items that are being packaged with the cushion. However, the bottom seal can be protected in accordance with the present invention by the nipping engagement between the dispersion member 70 and the drive roller 40, which isolates the bottom seal 83 from the foam composition as illustrated in FIG. 9. Additionally, the redistribution of the foam composition keeps the foam from expanding from only one point in the bag, and thus reduces forces on both the longitudinal and cross seals as the foam expands.

With reference again to FIG. 1, in accordance with one embodiment of the invention, the drive roller 40, the driven rollers 44, 46 on the shaft 48, the dispersion member 70, the frame 72, the anvil 80 and the cross-sealing and cutoff wire 82 (not visible in FIG. 1), and the motors 42 and 74 comprise a self-contained module that can be removed from the apparatus as a unit and replaced with another identical module or a differently configured module. The module includes opposite frame members 22a, 24a having support rods 26 connected therebetween. The module mounts in the apparatus by engaging thumb screws 84 of the module in corresponding threaded holes of the frame members of the apparatus. The modularity of the design means that in a short time the module can be replaced with one that uses a different width of film, or a module having a dispersion member with a different shape. For example, the dispersion member can have troughs in it to shape the foam. A large rolling dispersion member can be used that has dimples or other shapes in it to create a foam version of bubble pack, a waffle shape, or many others. Instead of a rolling dispersion member, a variety of plow type devices can be used to shape the foam.

Figure 14:
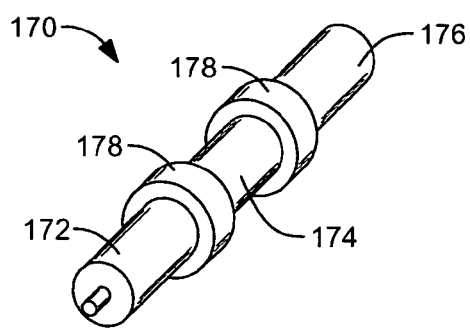
FIG. 14 illustrates a dispersion roller having a non-constant cross-sectional shape along its length.

FIG. 14 depicts a dispersion roller 170 having a non-constant cross-sectional shape along its length. In particular, the roller includes a first end portion 172, a middle portion 174, and a second end portion 176 all of which are circular cylindrical in shape and have a first relatively small diameter. The roller further includes two larger-diameter portions 178, one being disposed between the first end portion 172 and the middle portion 174, and the other being disposed between the middle portion 174 and the second end portion 176. The larger-diameter portions 178 are of circular cylindrical shape and have a second diameter larger than the first diameter of the portions 172, 174, 176.

Figure 15:
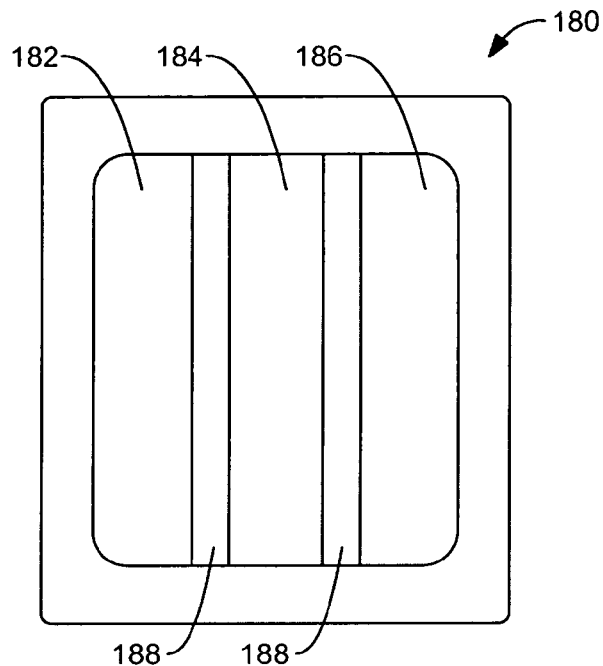
FIG. 15 is a diagrammatic plan view of a cushion formed using the dispersion roller of FIG. 14.
Figure 16:
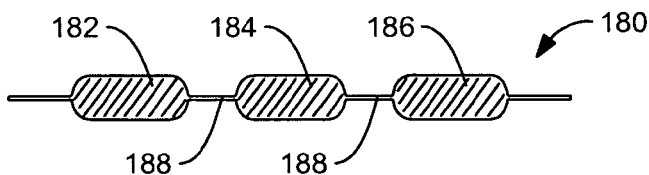
FIG. 16 is a cross-sectional view through the cushion of FIG. 15.
Figure 17:
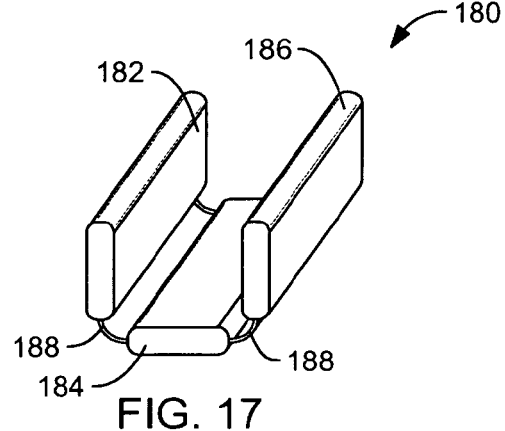
FIG. 17 illustrates a generally U-shaped structured formed by folding the cushion of FIG. 15.

When a cushion containing a volume of foam-forming composition is advanced through the gap between the dispersion roller 170 and the drive roller 40 (FIG. 10), the cushion 180 (FIGS. 15 and 16) is formed to have three portions 182, 184, 186 of relatively larger thickness as formed by the respective smaller-diameter portions 172, 174, 176 of the dispersion roller, and two portions 188 of smaller thickness as formed by the larger-diameter portions 178 of the dispersion roller. The smaller-thickness portions are alternately arranged with the larger-thickness portions. The smaller-thickness portions 188 can serve as hinges or fold lines to allow the cushion to be folded into a generally U-shaped configuration as depicted in FIG. 17.

Figure 18:
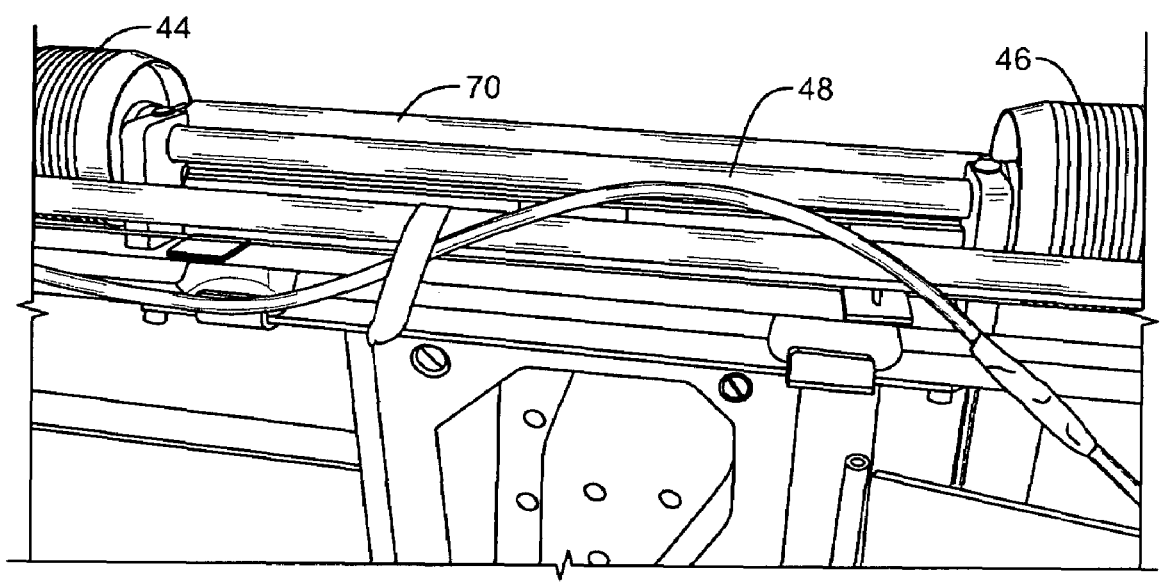
FIG. 18 is a fragmentary perspective view of an apparatus having a driven dispersion roller in accordance with a further embodiment of the invention.
Figure 19:
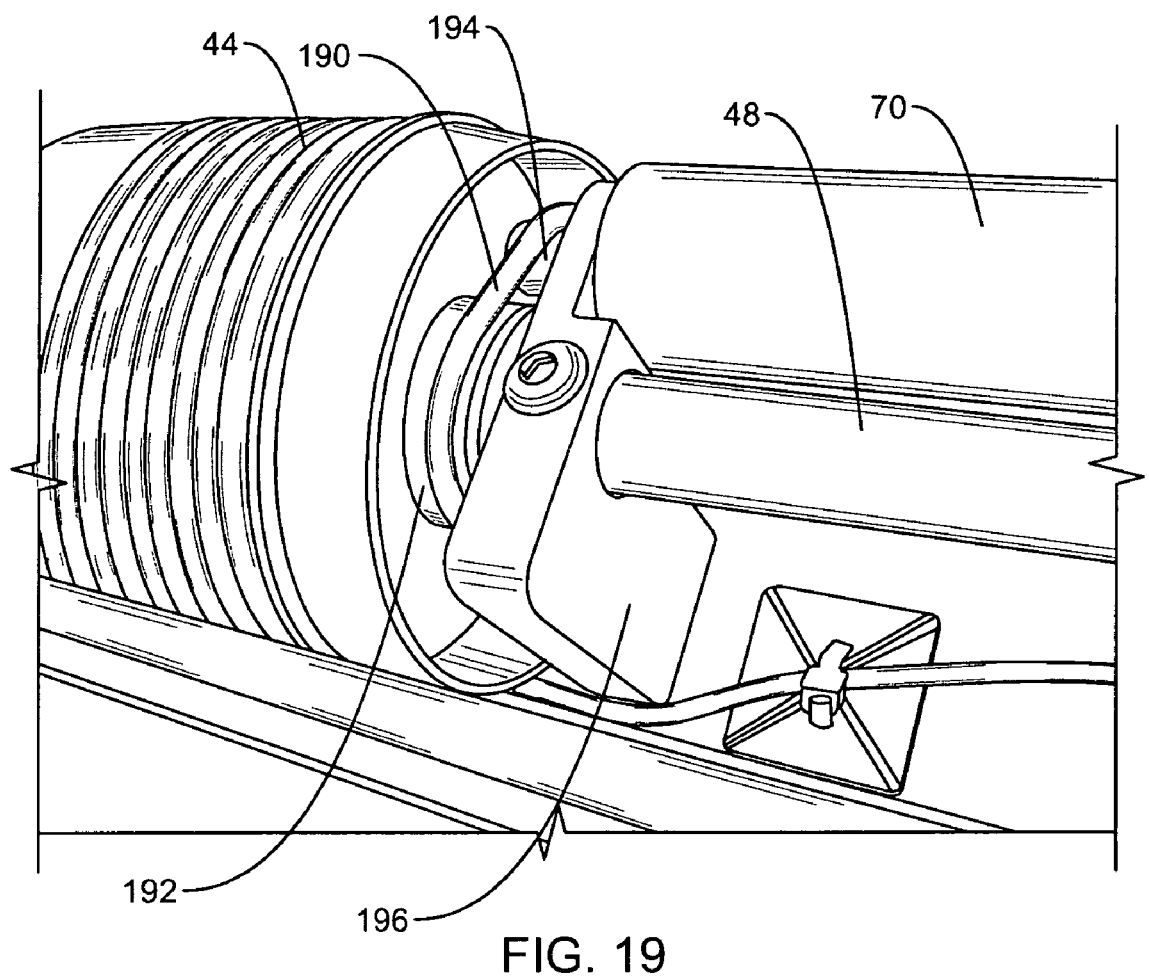
FIG. 19 is a fragmentary perspective view of the apparatus on an enlarged scale, showing details of the drive arrangement for driving the dispersion roller.

As noted, the dispersion member 70 can be a driven roller instead of a freely rotating roller. For instance, as illustrated in a further embodiment of the invention depicted in FIGS. 18 and 19, the dispersion roller 70 can be mechanically linked to the driven rollers 44, 46 mounted on the shaft 48 such that the dispersion member is driven along with the driven rollers, and the mechanical linkage can be designed such that the dispersion member's peripheral speed has a predetermined relationship to the peripheral speed of the driven rollers 44, 46 (e.g., the same as that of the driven rollers). As shown in FIG. 19, drive members 190 (e.g., belts or O-rings) Or the like can be looped about a hub portion 192 of each of the driven rollers 44, 46 and about projecting end portions 194 of the dispersion roller 70 such that rotation of the driven rollers 44, 46 causes the dispersion roller to also be rotated. The relative diameters of the hub portions 192 of the rollers 44, 46 and the end portions 194 of the dispersion roller 70 engaged by the drive members 190 can be selected such that the correct drive ratio is provided in order to set the peripheral speed of the dispersion roller in a predetermined relationship to that of the driven rollers (e.g., equal to or slightly faster than the driven rollers). The driven dispersion roller may be advantageous over a freely rotating one for various reasons, including a lesser tendency for the film to bunch up in front of the dispersion roller.

As illustrated in FIG. 19, the driven roller 44 (and likewise the unillustrated roller 46) can include a recess in its end in which the hub portion 192, the drive member 190, and the dispersion roller end portion 194 reside. Additionally, as shown, the shaft 48 for the driven rollers extends through apertures in support brackets 196 mounted on fixed structure of the apparatus. The support brackets are closely adjacent the ends of the driven rollers having the recesses.

In light of the foregoing description of certain exemplary embodiments of the invention, it will be appreciated that the present invention enables expanding foam cushions to be produced with controlled placement of the foam within the polymer film. Such controlled placement is achieved through control of the position, speed of movement, and operation of the foam dispenser 50, 150, control of the position of the dispersion member 70, and control of the film drive 40, 44, 46. With respect to the foam dispenser, the position of the dispenser can be controlled as previously described, but additionally or alternatively the dispenser can be controlled as to whether it is dispensing or not while the film is being advanced and/or while the dispenser is moving. For example, the dispenser can be moved and/or the film can be advanced while the dispenser is alternately turned on to dispense foam and turned off to stop dispensing foam, thereby creating discrete spaced-apart foam regions. The speed of the dispenser movement also can be varied while the dispenser is in its "on" state dispensing foam. With respect to the film drive, the speed of film advancement can be varied while the dispenser is "on" in order to help control the distribution of the foam-forming composition. The invention thus enables substantial versatility through control over various primary variables affecting the placement of foam.

As but one example of the versatility enabled by the invention, a cushion can be produced having foam distributed in an elongated generally C-shaped configuration to facilitate molding the cushion in a mold having a C-shaped mold cavity wherein the two "legs" of the C-shape and adjoining portions of the upright part of the C-shape extending between the legs are relatively thick, and the middle portion of the upright part is relatively thin. In such a case, it is desirable for the foam to be distributed in the cushion prior to molding such that there is more foam composition where the thick portions are to be formed and less foam composition where the thin portion is to be formed. Accordingly, the following procedure can be used to produce the desired cushion:

1) To start, the dispersion member 70 is closed (as in FIG. 9), the dispenser 50, 150 is positioned in a location toward one longitudinal edge of the film, and the film is driven for a predetermined distance (e.g., 2 inches) while the dispenser is "off". This provides extra film at the bottom of the cushion to create sufficient room for the foam to expand.

2) The dispenser is turned "on" and the dispenser is moved toward the opposite longitudinal edge of the film for a predetermined distance (e.g., 4 inches) and then brought to a stop. The film is not driven during this movement of the dispenser. This makes the lower leg of the C-shape.

3) The dispenser remains "on" and the film is driven a predetermined distance (e.g., 6 inches) at a speed of 80% of maximum. The slower speed allows more foam to be placed in the cushion in this location. The dispersion member is moved to a position that spreads the foam to a width approximately that of the width of the molded cushion to be produced.

4) Through the middle of the upright of the C-shape, the molded part has a thinner cross-section. The dispenser remains "on", and the film drive speed is increased to 90% so that relatively less foam is dispensed in the middle portion. The gap between the dispersion member and the drive roller is opened wider so as not to spread the foam as much, because the molded part is thinner as well as shallower in the middle portion of the upright. This occurs for a predetermined distance (e.g., 18 inches) of film travel.

5) The film drive speed is reduced to 80% and the dispersion roller is closed enough to spread the foam the width of the molded part for the upper thick section, similar to step 3 above.

6) The film drive then stops and the dispenser (which is still "on") is moved toward the first longitudinal edge of the film for a predetermined distance (e.g., 4 inches), similar to step 2 above, and the dispenser is shut off. This creates the upper leg of the C-shape.

7) The dispersion member opens fully, the film is driven for a predetermined distance (e.g., a few inches) and is then cut off. The cushion is placed into the mold.

The above example is only one of a virtually unlimited variety of processes that can be employed in accordance with the invention for making cushions of many different configurations. With the ability to turn the dispenser on and off while moving the dispenser and/or the film (which ability is not employed in the above example), even more complex shapes can be created. The degree of control over the foam placement made possible by the invention not only enables the cushion shape and its properties to be precisely controlled, but can also facilitate other advantages. For example, it is possible to eliminate or reduce the need for sealing of the film portions by controlling the placement of the foam in such a manner that even when fully expanded the foam remains between the film portions without escaping. Thus, the longitudinal and/or the transverse seals potentially can be omitted, thereby simplifying the apparatus and process.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for making foam-in-place cushions, comprising:

a film supply and guide system for supplying a pair of continuous polymer film portions extending along a longitudinal direction and for positioning the film portions in parallel opposing relation to each other;

a dispenser disposed between the film portions and operable for dispensing a foam-forming composition between the film portions, the foam-forming composition being operable to react to form an expanded polymer foam material;

a film drive mechanism structured and arranged for advancing the film portions in the longitudinal direction, the film drive mechanism including a drive roller rotatable about an axis and positioned to contact one of the advancing film portions, and a pair of transversely spaced driven rollers that form nips with the drive roller, opposite longitudinal edges of the film portions passing through the nips and being frictionally engaged and advanced by the drive roller; and a dispersion member extending along an axis spaced from the axis of the drive roller and spaced from an axis about which the driven rollers rotate, the dispersion member being structured and arranged to apply pressure on predetermined areas of one of the advancing film portions towards the other so as to cause the foam-forming composition to be redistributed while the foam-forming composition is in a less than fully expanded state.

2. The apparatus of claim 1, the drive roller contacting one of the film portions and the dispersion member contacting the other film portion.

3. The apparatus of claim 1, wherein the film portions are provided as a C-fold film folded along a medial longitudinal fold line and wound into a supply roll, the supply roll being rotatably mounted such that an outer surface of the supply roll engages the drive roller, rotation of the drive roller causing the supply roll to be rotated such that the C-fold film is paid out from the supply roll.

4. The apparatus of claim 1, wherein the dispersion member is mounted in a frame that is rotatable about a pivot axis spaced from and parallel to the axis of the dispersion member, rotation of the frame about the pivot axis causing the gap between the dispersion member and the drive roller to vary in width.

5. The apparatus of claim 4, further comprising an actuator coupled with the frame for rotating the frame from an initial position at the beginning of a cushion-making cycle wherein the dispersion member is in a first position closely adjacent the drive roller, and a dispersion position in which the dispersion member is moved to a second position spaced farther from the drive roller to set the gap therebetween.

6. The apparatus of claim 5, wherein the film drive mechanism is operable to rotate the drive roller to advance a predetermined length of the film portions through the gap and then stop to halt the film portions for formation of a transverse seal and for severing of the film portions.

7. The apparatus of claim 6, further comprising a cross sealing device and cut-off device comprising a heated member structured and arranged to be placed in contact with the film portions to form the transverse seal and to sever the film portions.

8. The apparatus of claim 7, wherein a pressing member is mounted in the frame, and the actuator is operable to rotate the frame to a seal-and-cutoff position in which the pressing member presses the film portions against the heated member in order to seal and sever the film portions.

9. The apparatus of claim 4, wherein the frame is mounted to rotate about a shaft and the driven rollers that form the nips with the drive roller are mounted on the shaft.

10. The apparatus of claim 1, wherein the film portions are provided as a C-fold film folded along a medial longitudinal fold line, and further comprising a side sealing device structured and arranged to seal together the longitudinal edges of the film portions opposite from the fold line.

11. The apparatus of claim 1, wherein the dispersion member is included and comprises a roller that is rotatable about the axis of the dispersion member.

12. The apparatus of claim 11, wherein the dispersion member is driven to rotate about the axis thereof.

13. The apparatus of claim 1, wherein the dispersion member is configured to redistribute the foam-forming composition into a layer whose thickness varies in a predetermined manner in at least one of the longitudinal and transverse directions.

14. The apparatus of claim 1, further comprising a dispenser traversing mechanism operable to move the dispenser in a transverse direction relative to the film portions during dispensing of foam-forming composition therefrom.

* * * * *

UNITED STATES PATENT AND TRADEMARK OFFICE
CERTIFICATE OF CORRECTION

PATENT NO. : 7,607,911 B2
APPLICATION NO. : 11/411708
DATED : October 27, 2009
INVENTOR(S) : Sperry et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,607,911 B2 | Page 1 of 1 |
| APPLICATION NO. | : 11/411708 | |
| DATED | : October 27, 2009 | |
| INVENTOR(S) | : Sperry et al. | |

It is certified that error appears in the above-identified patent and that said Letters Patent is hereby corrected as shown below:

Column 8,

Line 57, "FIG. Sa" should read --FIG. 5a--.

Signed and Sealed this

Fourth Day of January, 2011

David J. Kappos
*Director of the United States Patent and Trademark Office*